United States Patent
Taylor et al.

(10) Patent No.: US 12,321,656 B2
(45) Date of Patent: Jun. 3, 2025

(54) APPLICATION CASTING

(71) Applicant: Apple Inc., Cupertino, CA (US)

(72) Inventors: Joshua J. Taylor, Cupertino, CA (US); Pablo P. Cheng, Chino Hills, CA (US); Michael E. Buerli, San Jose, CA (US); Naveen K. Vemuri, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 17/541,207

(22) Filed: Dec. 2, 2021

(65) Prior Publication Data
US 2022/0244903 A1 Aug. 4, 2022

Related U.S. Application Data

(60) Provisional application No. 63/145,952, filed on Feb. 4, 2021.

(51) Int. Cl.
*G06F 3/14* (2006.01)
*G06F 3/0481* (2022.01)
*G06F 3/0484* (2022.01)

(52) U.S. Cl.
CPC .......... *G06F 3/1454* (2013.01); *G06F 3/0481* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 8,965,349 B2 | 2/2015 | Kieft et al. | |
| 9,716,720 B2 | 7/2017 | Adams et al. | |
| 9,740,507 B2 | 8/2017 | Pinto et al. | |
| 2006/0187305 A1* | 8/2006 | Trivedi | G06T 7/292 |
| | | | 348/169 |
| 2009/0055542 A1 | 2/2009 | Zhao et al. | |
| 2009/0241104 A1* | 9/2009 | Amiga | G06F 8/65 |
| | | | 717/174 |
| 2011/0289410 A1* | 11/2011 | Paczkowski | G11B 27/034 |
| | | | 379/202.01 |
| 2013/0288753 A1* | 10/2013 | Jacobsen | G06F 3/0482 |
| | | | 455/563 |
| 2014/0229542 A1* | 8/2014 | Yu | H04L 65/403 |
| | | | 709/204 |
| 2016/0210108 A1* | 7/2016 | Roytblat | G06F 17/00 |
| 2019/0222628 A1 | 7/2019 | Kelani et al. | |
| 2019/0340836 A1 | 11/2019 | Lynen et al. | |
| 2021/0019946 A1 | 1/2021 | Sonasath et al. | |
| 2021/0352120 A1* | 11/2021 | Masi | H04L 67/025 |

OTHER PUBLICATIONS

Extended European Search Report from European Patent Application No. 24206654.6, dated Feb. 11, 2025, 12 pages.
Indian Office Action from Indian Patent Application No. 202317048638, dated Apr. 8, 2025, 7 pages.

* cited by examiner

*Primary Examiner* — Matthew Ell
*Assistant Examiner* — Gabriel Mercado
(74) *Attorney, Agent, or Firm* — BAKERHOSTETLER

(57) ABSTRACT

Application casting is provided, in which an application running on an electronic device is casted to another electronic device that does not have access to the application. The application is casted by providing sufficient information for rendering of a user interface of the application, at the device that does not have access to the application, with applied modifications such as user preferences for the device that does not have access to the application.

21 Claims, 11 Drawing Sheets

APPLICATION CASTING

CROSS REFERENCE TO RELATED APPLICATIONS

This application claims the benefit of priority to U.S. Provisional Patent Application No. 63/145,952, entitled "Application Casting," filed on Feb. 4, 2021, the disclosure of which is hereby incorporated herein in its entirety.

TECHNICAL FIELD

The present description relates generally to multi-user environments in computing platforms.

BACKGROUND

A user of an electronic device commonly uses applications running on that electronic device to view and/or interact with data. Often, users exchange data, such as by sending files over email, that each user can locally view and manipulate with the application running on their own electronic device. Each user can then re-share updated data with the other user if desired. In order to improve the efficiency of sharing data, some applications provide for cooperative viewing and/or manipulation of data by multiple users of a common application that is installed and running locally on multiple devices. However, in scenarios in which one of the users does not have the application installed or running on their device, the sharing of application data is typically limited or unavailable.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
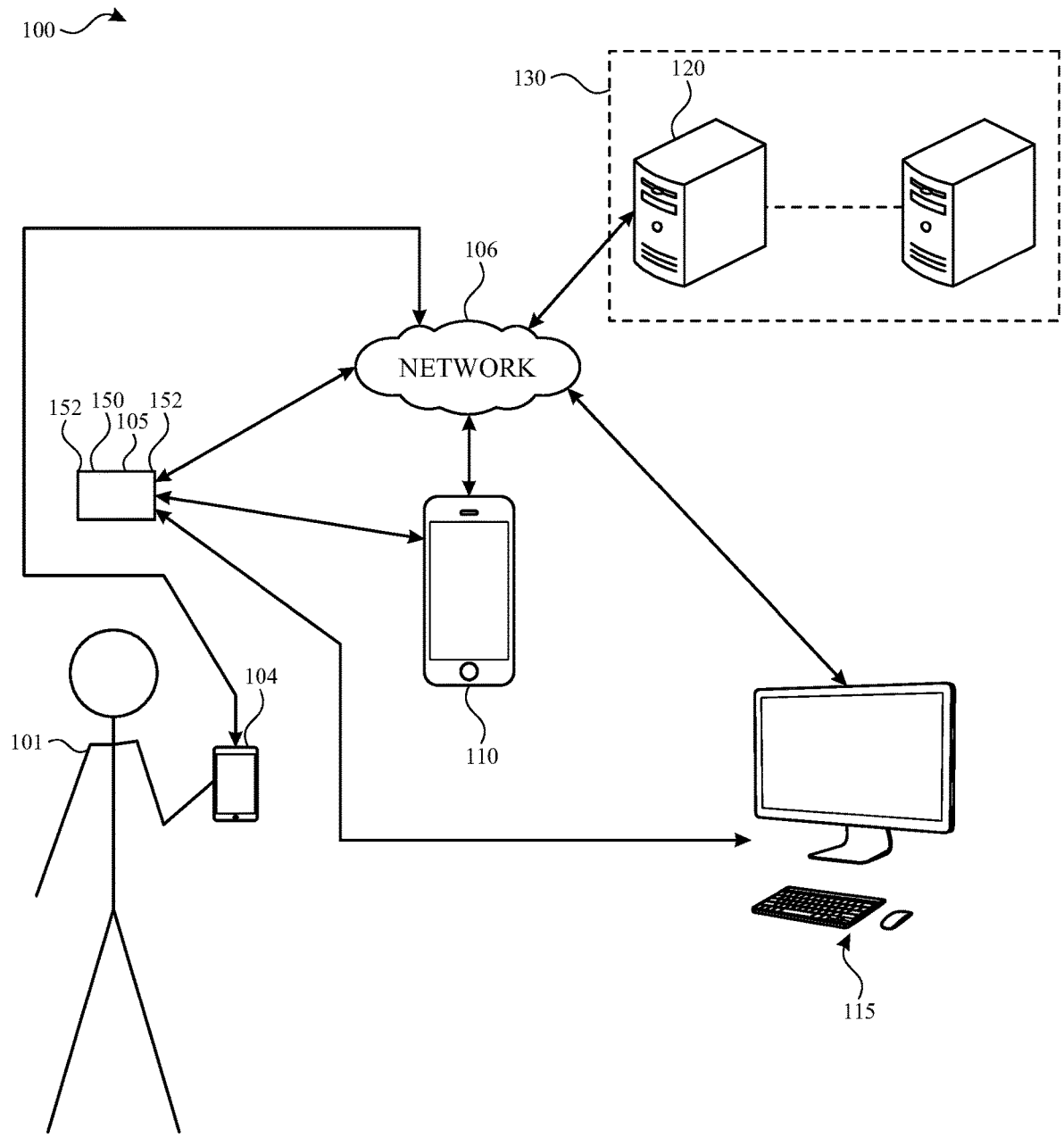
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide for sharing of applications between electronic devices, particularly when one of the electronic devices does not have access to the application (e.g., because the application or an updated version of the application is not installed and/or is not running at that device). In some scenarios, all of the application data that is used for displaying a user interface (UI) of the application at the device running the application data can be continuously transmitted to another electronic device, so that the full functionality of the application is provided at the other electronic device. However, transmitting the full application data in this way can consume large amounts of bandwidth and processing power that may be unavailable or impractical in various scenarios.

In other scenarios, a flat image of the UI can be transmitted from the application running the device to the application that does not have the application so that the user of the other device can view the UI exactly as displayed at the device running the application (e.g., in a screen sharing mode of a video conferencing application). However, providing only flat images to the other device can prevent the other device from displaying or modifying the UI in accordance with a preferred format, another preference, or a position or orientation of a user of the second device. This can be particularly problematic when the UI of application being shared for display in a three-dimensional environment, such as a XR environment.

Aspects of the subject technology facilitate collaborative use of an application by first and second users of first and second devices when an application is only installed at one of the devices. In one or more implementations, an application-agnostic framework (e.g., a system level framework on both devices) allows the device running the application to cast a version of an application user interface (UI) that is displayed at the first device running the application, to the second device on which the application is not installed.

The version of the application can be a non-interactive version of the UI that is displayed at the first device, but may include sufficient state information to allow the second device to render the UI using one or more user or device preferences stored at the second device and/or using features of the environment of the second device. In other implementations, the state information can include sufficient information to allow interaction with the version of the UI that is displayed at the second device, such interacting including moving, resizing, rotating, or recoloring the UI independently of the UI displayed at the first device. In other implementations, the state information can include sufficient information to allow interactions (e.g., user inputs to the application) that are captured by the second device and transmitted back to the first device as inputs to the application running on the first device (e.g., and recast back to the second device).

In one or more implementations, the application casts a version of an application user interface that is displayed at the first device running the application to the second device on which the application is not installed, together with anchoring information that allows the first and second devices to display their respective versions of the UI at coordinated locations in respective three-dimensional (e.g., XR) environments of each device. The anchoring information can be provided to ensure that the UI is displayed by both devices as a common location relative to a shared origin in the environment of each device. This can be useful when multiple UI elements and/or other (e.g., shared) applications are displayed concurrently, to allow transfer of content between elements or applications by one of the devices, and/or to allow element and/or application interactions to be displayed correctly at both devices. For example, this can be useful to adjust the size or orientation of the version of the UI at the second device to account for a position of the user of the second device relative to the displayed version of the UI.

In one or more implementations, the version of the application that is displayed by the second device can be moved to a new location in the second physical environment of the second device, with or without affecting the location of the UI displayed by the first device. In one or more implementations, sufficient state information for the UI can be provided from the first device to the second device to allow partial or full user interaction with the version of the user interface that is displayed by the second device to control the application running at the first device.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smart phone, a tablet device, or a wearable device such as a head mountable portable system, that includes a display system capable of presenting a visualization of an extended reality environment to a user 101. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating recording within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects to an XR application generating virtual content, such as a UI of an application, for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic system discussed below with respect to FIG. 14. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 14.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
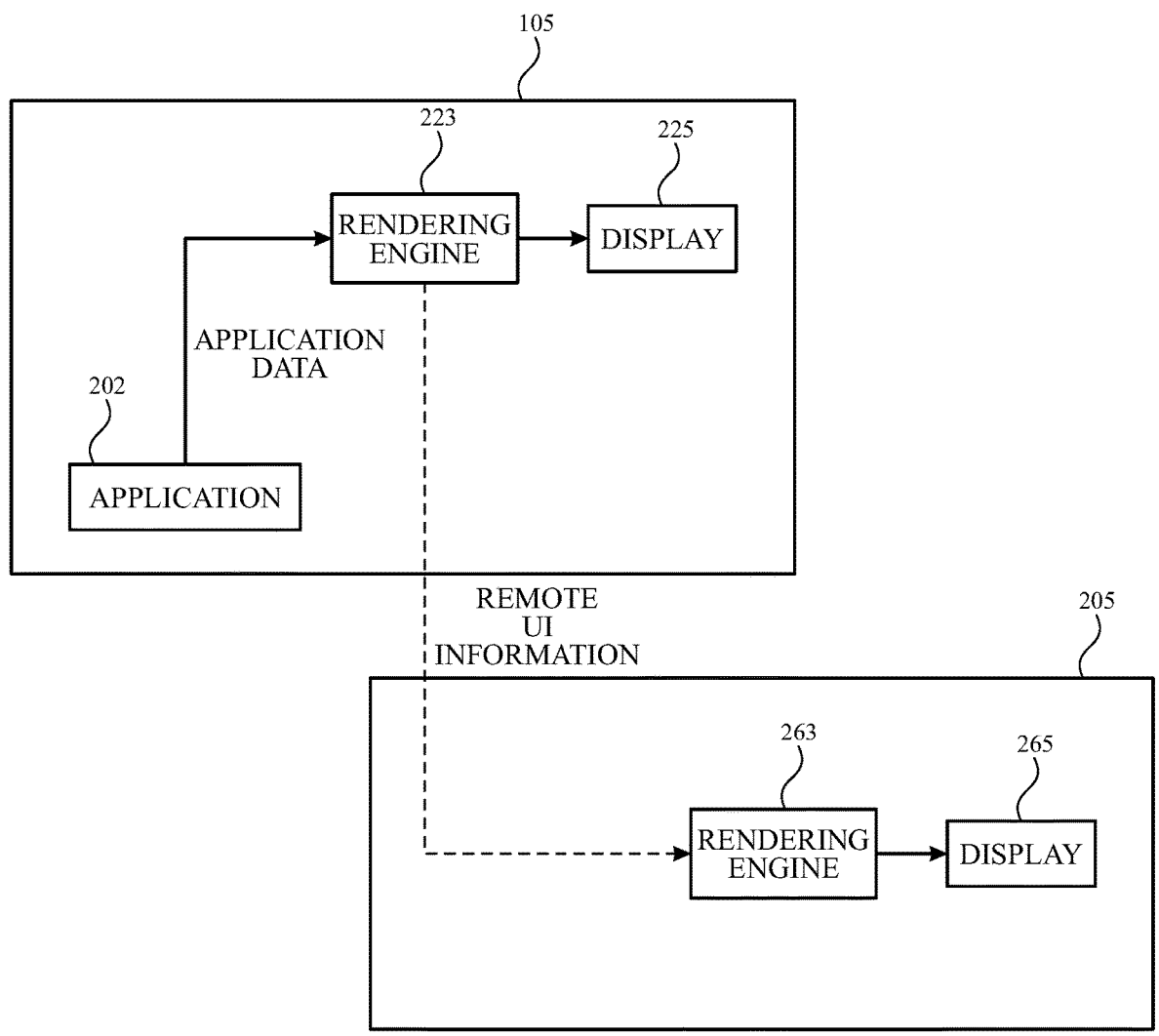
FIG. 2 illustrates example computing devices that may implement aspects of the subject technology.

FIG. 2 illustrates an example architecture that may be implemented by the electronic device 105 and another electronic device 205 (e.g., the handheld electronic device 114, the electronic device 110, the electronic device 115, or another electronic device 105) in accordance with one or more implementations of the subject technology. For explanatory purposes, portions of the architecture of FIG. 2 is described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein. In the example of FIG. 2, an application such as application 202 provides application data to a rendering engine 223 for rendering of a UI of the application. The application data may include application-generated content (e.g., windows, buttons, tools, etc.) and/or user-generated content (e.g., text, images, etc.), and information for rendering the content in the UI. Rendering engine 223 renders the UI for display by a display such as display 225 of the electronic device 105.

As shown in FIG. 2, another electronic device 205, in communication with electronic device 105 does not have the application 202 installed or available. In the example of FIG. 2, electronic device 105 casts the application (e.g., the UI of the application) to the other electronic device 205 by providing remote UI information to the other electronic device 205 (e.g., to a rendering engine 263 of the other electronic device 205). In the example of FIG. 2, rendering engine 223 is shown as providing the remote UI information to the other electronic device 205. However, this is merely illustrative, and the remote UI information may be provided by application 202 and/or other system processes running at electronic device 105, including system processes that may be implemented before or after the rendering engine 223 in the pipeline for providing a UI for application 202 to display 225.

The remote UI information that is provided from the electronic device 105 to electronic device 205 may include one or more images, one or more video streams, and/or one or more other assets associated with one or more elements of the user interface, one or more layer trees that describe the layout and/or appearance of the one or elements of the user interface, and metadata for the user interface. In one or more implementations, the metadata can include the one or more layer trees. For example, when the rendering engine 223 generates rendered display frames for display of the UI by display 225, the rendering engine 223 may also generate one or more display frames of portions of the UI (e.g., elements of the UI such as text fields, buttons, tools, windows, dynamic content, images, embedded videos, etc.). The display frames of the portions of the UI can be provided as images for static elements, and/or can form corresponding video streams that can be provided to the other electronic device 205 for rendering of a version of the UI at by rendering engine 263. In one or more implementations, the electronic device 105 may combine one or more of the elements of the UI into a combined video stream. For example, the electronic device 105 may determine that two or more elements of the UI are coplanar and partially overlapping, and generate a video stream representing the current view of the two or more coplanar and partially overlapping elements.

Rendering engine 223, application 202, and/or other processes at electronic device 105 may also generate, based on the application data, one or more layer trees that describe (e.g., in hierarchical form) how the one or more images, video streams, and/or state information associated with elements of the UI can be combined to form a version of the UI for display 225. Rendering engine 223, application 202, and/or other processes at electronic device 105 may also generate metadata that includes timing information for synchronizing the layer trees with the images, video streams, and/or state information (e.g., primitives) of the various portions of the UI, for generation of the version of the UI at the other electronic device 205. In one or more implementations, when the UI displayed at electronic device 105 changes (e.g., due to user input at the electronic device 105 and/or due to application activity of application 202), one or more new layer trees, or one or more delta (difference) layer trees may be sent to the other electronic device 205 to update the version of the UI at the other device.

At the other electronic device 205, rendering engine 263 may render the version of the user interface using the one or more layer trees and the one or more video streams, by, for example, applying a preference of the second device to at least one of the one or more layer trees, and synchronizing the one or more video streams and the one or more layer trees using the metadata received from the first device. The other electronic device 205 may then display the rendered version of the user interface using display 265 (e.g., with the one or more video streams and/or one or more other assets displayed according to the instructions in the one or more layer trees). In some use cases, a layer tree may arrive at the electronic device 205 before a corresponding asset for a layer of the layer tree. In such a use case, the electronic device 205 may display a placeholder at the location of the asset until the asset arrives from the electronic device 105.

In one or more implementations, a layer tree may provide a hierarchy of layers, a tree or graph structure (e.g., a view tree, and/or a scene graph), and/or any other declarative form of describing a UI. For example, a layer tree may include and/or may be associated with a hierarchy of layers that describes each layer of the UI for display. For example, the UI may include content in conjunction with a backdrop, which may utilize one or more blur layers and/or other filter layers. Thus, the tree may include a node and/or subtree that contains one or more attributes describing the blur layer, such as depth, size, placement, and the like. In one or more implementations, rendering engine 263 may parse a layer tree to manage the rendering of portions of the UI, such as portions corresponding to individual video streams for the UI. In one or more implementations, the electronic device 105 (e.g., the rendering engine 223 or a system process at the electronic device 105) may serialize the layer tree and/or one or more assets such as images, video streams, or the like, for transmission to the electronic device 205.

In some use cases, the electronic device 105 may determine that the version of the UI that is transmitted for rendering at the electronic device 205 can no longer be transmitted as a combination asset(s), layer tree(s), and/or metadata. For example, the electronic device 105 may determine that the bandwidth and/or quality of the connection between the electronic device 105 and the electronic device 205 is insufficient, that computing resources (e.g., power, memory, and/or processing resources) of the receiving device are insufficient, and/or that compatibility issue between the operating systems of the electronic device 105 and the electronic device 205 may lead to and/or may have led to an invalid state of the UI, or a portion thereof, at the electronic device 205. In a use case in which the electronic device 105 determines that the version of the UI that is transmitted for rendering at the electronic device 205 can no longer be transmitted as a combination asset(s), layer tree(s), and/or metadata (e.g., due to a reduced capability of the other electronic device 105), the electronic device may switch to a fallback mode in which the UI (e.g., the entire UI) is encoded into a video stream and transmitted to the electronic device 205 (e.g., without metadata for reconstruction and/or rendering of the UI at the electronic device 205). In one or more implementations, the electronic device 105 may monitor the connection and/or the computing resources of the electronic device 205, and switch back to transmitting the version of the UI as a combination asset(s), layer tree(s), and/or metadata when the connection and/or computing resources are sufficient to avoid an invalid state at the electronic device 205.

In one or more implementations, layers of a layer tree may be associated with depth information that can be translated to a z-coordinate (and/or z-plane) in a three-dimensional coordinate system. In the example of FIG. 2, application 202 is casted for, for example, display of a UI of the application 202 in a two-dimensional scene such as on a display of smartphone, a tablet device, or a computer monitor, or a television.

Figure 3:
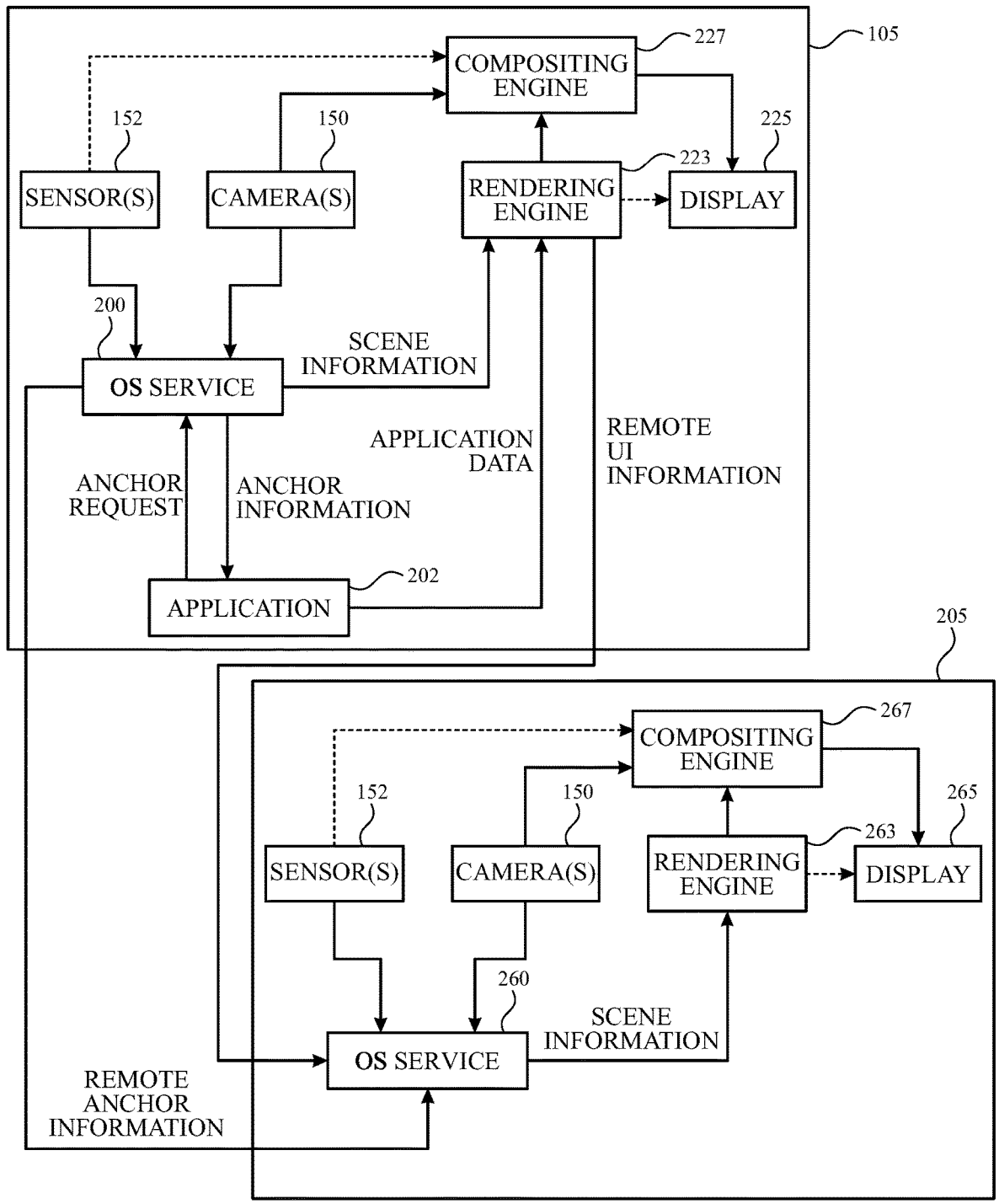
FIG. 3 illustrates another example of computing devices that may implement aspects of the subject technology.

FIG. 3 illustrates another implementation, in which additional information is provided for display of the UI of the application 202 in a three-dimensional (e.g., XR) scene. In the example of FIG. 3, sensors 152 provide environment information (e.g., depth information from one or more depth sensors) to an operating system (OS) service, such as OS service 200. In one or more implementations, OS service 200 may be a service that is provided by the operating system of the electronic device 105, and that performs operations for generating an XR environment. Camera(s) 150 may also provide images of a physical environment to OS service 200. OS service 200 may generate three-dimensional scene information, such as three-dimensional map, of some or all of the physical environment of electronic device 105 using the environment information (e.g., the depth information and/or the images) from sensors 152 and camera(s) 150.

As illustrated in FIG. 3, application 202 may request an anchor, such as a physical object anchor, from the OS service 200 in an anchor request. Application 202 may be a gaming application, a media player application, a content-editor application, a training application, a simulator application, or generally any application that provides a UI for display at a location that depends on the physical environment, such as by anchoring the UI to a physical object anchor.

A physical object anchor can be a general physical object such as a horizontal planar surface (e.g., a surface of a floor or a tabletop), a vertical planar surface (e.g., a surface of a wall), or a specific physical object such a table, a wall, a television stand, a couch, a refrigerator, a desk, a chair, etc. Application 202 may include code that, when executed by one or more processors of electronic device 105, generates application data, for display of a UI of the application on, near, attached to, or otherwise associated with the physical object anchor.

Once the application data has been generated, the application data can be provided to the OS service 200 and/or the rendering engine 223, as illustrated in FIG. 3. Environment information such as a depth map of the physical environment, and/or object information for detected objects in the physical environment, can also be provided to rendering engine 223. Rendering engine 223 can then render the application data from application 202 for display by display 225 of electronic device 105. The UI of application 202 is rendered for display at the appropriate location on the display 225, to appear in association with the physical anchor object or other anchor provided by OS service 200. Display 225 may be, for example, an opaque display, and camera(s) 150 may be configured to provide a pass-through video feed to the opaque display. The UI may be rendered for display at a location on the display corresponding to the displayed location of the physical anchor object in the pass-through video. Display 225 may be, as another example, a transparent or translucent display. The UI may be rendered for display at a location on the display corresponding to a direct view, through the transparent or translucent display, of the physical anchor object.

As shown, electronic device 105 can also include a compositing engine 227 that composites video images of the physical environment, based on images from camera(s) 150, for display together with the rendered UI from rendering engine 223. For example, compositing engine 227 may be provided in an electronic device 105 that includes an opaque display, to provide pass-through video to the display. In an electronic device 105 that is implemented with a transparent or translucent display that allows the user to directly view the physical environment, compositing engine 227 may be omitted or unused in some circumstances, or may be incorporated in rendering engine 223. Although the example of FIG. 3 illustrates a rendering engine 223 that is separate from OS service 200, it should be appreciated that OS service 200 and rendering engine 223 may form a common service and/or that rendering operations for rendering content for display can be performed by the OS service 200).

Although the example of FIG. 3 illustrates a rendering engine 223 that is separate from application 202, it should be appreciated that, in some implementations, application 202 may render content for display by display 225 without using a separate rendering engine.

Electronic device 105 may allow application 202 to request and obtain anchor information from OS service 200 (e.g., via an application programming interface, or API) as illustrated in FIG. 3, which can facilitate efficient development, implementation, and/or run-time execution of application 202 (e.g., since each application 202 does not have to do its own object detection, scene mapping, etc.). As shown in FIG. 3, when casting an application 202 for three-dimensional display by another electronic device such as the other electronic device 205, OS service 200 (e.g., or application 202 or rendering engine 223) can provide anchoring information (e.g., remote anchor information) for the UI of application 202 to the other electronic device 205 (e.g., to an operating system (OS) service such as OS service 260 and/or to a rendering engine 263 at the other electronic device). In one or more implementations, OS service 260 may be a service that is provided by the operating system of the electronic device 205, and that performs operations for generating an XR environment. In one or more implementations, the anchoring information may be serialized, along with one or more assets (e.g., images, video streams, etc.), one or more layer trees, and/or other metadata (e.g., including timing information) for transmission from the electronic device 105 to the electronic device 205. Although the example of FIG. 3 illustrates a rendering engine 263 that is separate from OS service 260, it should be appreciated that OS service 260 and rendering engine 263 may form a common service and/or that rendering operations for rendering content for display can be performed by the OS service 260).

As shown in FIG. 3, even though application 202 is not available at the other electronic device 205, OS service 260 (e.g., and/or rendering engine 263) can generate scene information using the remote UI information and the remote anchor information (e.g., in combination with environment information obtained by sensors 152 and/or camera (s) 150 of the other electronic device 205). As shown, the other electronic device 205 may also include a compositing engine 267 that composites video (e.g., from camera(s) 150 at the other electronic device 205) for display by display 265.

The anchoring information (e.g., remote anchor information) provided from electronic device 105 to the other electronic device 205 may include information indicating a location at which the other electronic device 205 should render the UI corresponding to application 202 in the environment (e.g., a physical environment, mixed reality environment, or a virtual environment) of the other electronic device 205. In one example, the anchoring information may include a transform that causes the anchor location for the UI of the other electronic device 205 to be similarly positioned relative to an origin in the environment of the other electronic device 205 as the UI is positioned by electronic device 105 relative to an origin in the environment of the electronic device 105. In operational scenarios in which the electronic device 105 and the other electronic device 205 are co-located (e.g., in a common or overlapping physical environment), the origin of the electronic device 105 and the origin for the other electronic device 205 may be at the same location. In operational scenarios in which the electronic device 105 and the other electronic device 205 are not co-located (e.g., the electronic device 105 and the other device are in remote physical environments), the origin of the electronic device 105 and the origin for the other electronic device 205 may be at different locations.

Figure 4:
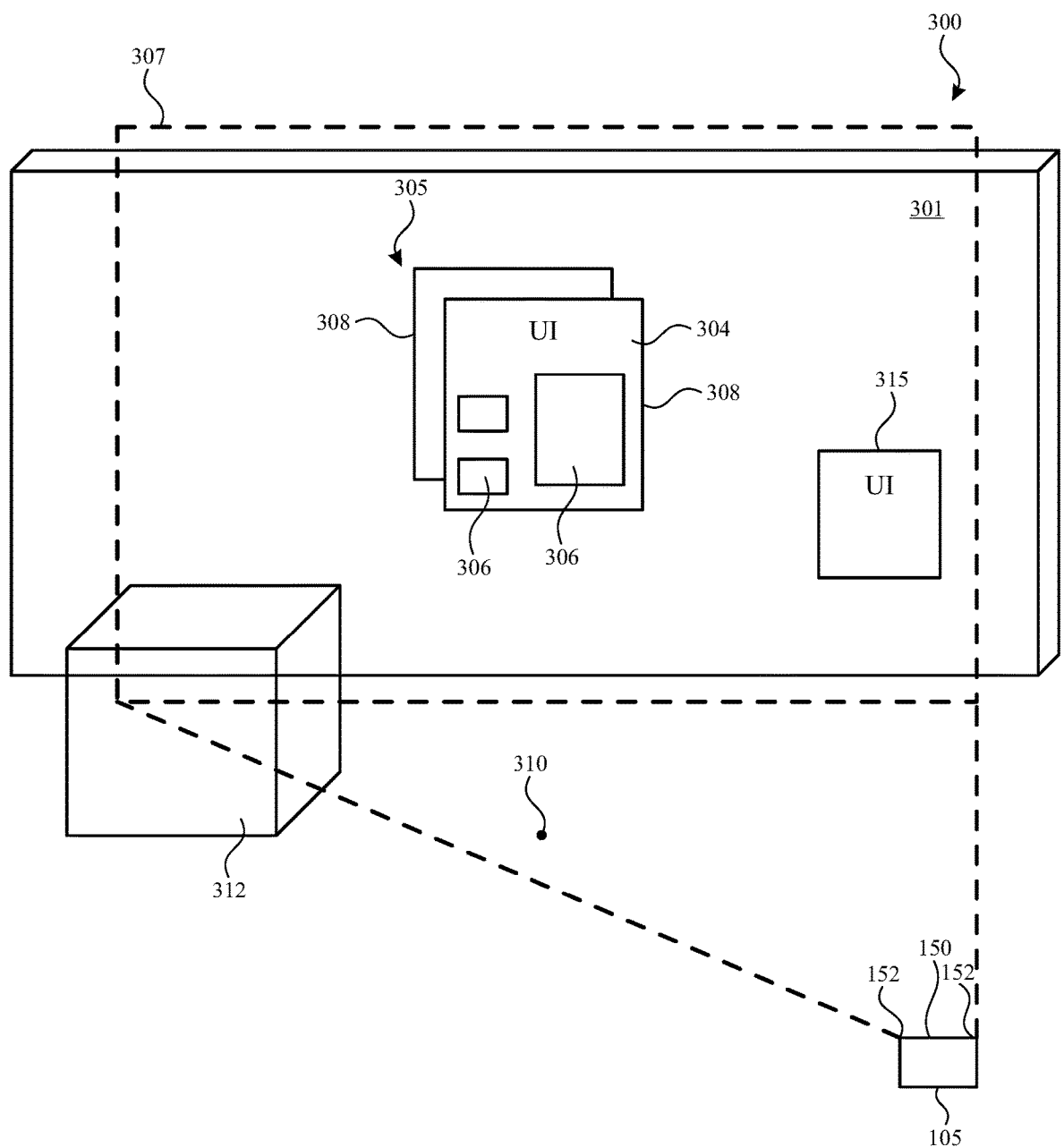
FIG. 4 illustrates an example of an environment of a first electronic device in accordance with aspects of the subject technology.

In one or more implementations, electronic device 105 displays a user interface of an application, such as application 202, running on the device at an anchor location in a physical environment of the electronic device. FIG. 4 illustrates an example in which a user interface 304 (e.g., of application 202) is displayed by electronic device 105 to appear at a location 305 in an environment such as physical environment 300 of the electronic device 105. In the example of FIG. 4, UI 304 includes multiple windows 308, each of which may include one or more elements 306. Elements 306 may include text entry fields, buttons, selectable tools, scrollbars, menus, drop-down menus, links, plugins, image viewers, media players, sliders, or the like. In the example of FIG. 4, UI 315 of another application is also displayed. In one or more implementations, the application corresponding to UI 315 may be a shared application that is running on electronic device 105 and one or more other electronic devices such as the other electronic device 205 of FIGS. 2 and 3.

In the example of FIG. 4, UI 304 and UI 315 are both displayed in the viewable area 307 of the display of the electronic device 105 to appear, in a three-dimensional environment of electronic device 105, as if they are on a physical wall 301 in the physical environment 300. In this example, a physical table 312 is also present in the physical environment 300. Display of the UI 304 to appear as though on the physical wall 301 can be achieved, in part, by defining an anchor location for UI 304 at location 305 on the physical wall. The anchor location can be defined by detection of the physical wall, and/or relative to an origin 310 for electronic device 105 in the physical environment 300. For example, electronic device 105 may generate and/or store a transform between the origin 310 and the anchor location at location 305. In this way, if electronic device 105 is moved within the physical environment 300, the display UI 304 remains at the anchored location on physical wall 301. In one or more implementations, when electronic device 105 and one or more other electronic devices, such as the other electronic device 205 of FIGS. 2 and 3, are communicatively coupled, the electronic device 105 may share origin information with the other electronic device(s).

In one or more implementations, the user of electronic device 105 may desire to share the UI 304 of application 202 with another user of another device (e.g., another device that is located in the same physical environment 300 or an a remote, separate physical environment). In one or more implementations, electronic device 105 may determine that the other device (e.g., the other electronic device 205 of FIGS. 2 and 3) that is in communication with the device (e.g., and with which the user has indicated a desire to share the UI 304) does not have the application installed. Responsive to determining that the other device does not have the application installed, electronic device 105 may provide, to the other device on which the application is not installed, information associated with the user interface 304 of the application 202. As discussed herein, the information associated with the user interface 304 may include visual display information (e.g., remote UI information as described in connection with FIGS. 2 and/or 3) and anchoring information (e.g., remote anchor information as described in connection with FIG. 3) for the user interface 304. For example, the anchoring information may define the anchor location at location 305 relative to an origin 310 in the physical environment 300 of the electronic device 105.

Figure 5:
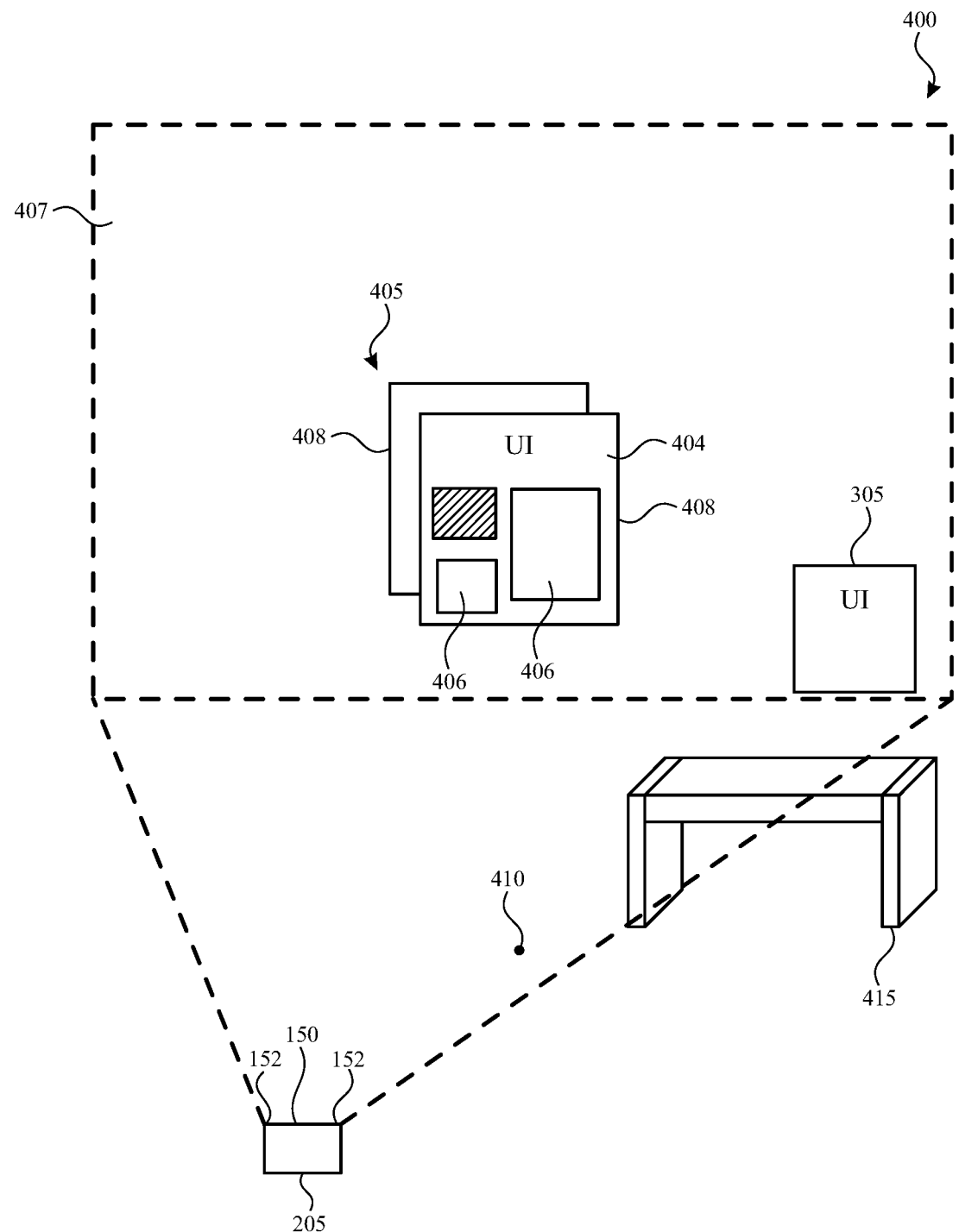
FIG. 5 illustrates an example of an environment of a second electronic device in accordance with aspects of the subject technology.

FIG. 5 illustrates an example of a physical environment 400 of the other electronic device 205. In this example, the physical environment 400 is separate and remote from the physical environment 300 of electronic device 105. In the example of FIG. 5, the other electronic device 205 has received and is displaying a version 404 of the UI 304 that is displayed by electronic device 105 running the application 202. In this example, the version 404 of the UI 304 includes versions 408 of the multiple windows 308 of UI 304 of FIG. 4, and versions 406 of the elements 306 of UI 304 of FIG. 4. The versions 406 of the elements 306 may be generated based on state information for the element, an image of the element, and/or a video stream of the element as provided by electronic device 105. The arrangement of elements reconstructed from state information, the image(s) corresponding to the elements, and/or video streams corresponding to the elements, to form the versions 408 of the windows 308 and the version 404 of the UI 304 overall, may be determined using one or more layer trees and corresponding metadata provided from electronic device 105. For example, the OS service 260, the rendering engine 263 and/or the compositing engine 267 may parse the one or more layer trees to manage the rendering various elements 306 of the UI.

As shown in FIG. 4, some of the versions 406 of the elements 306 appear differently in the version 404 of UI 304 than the corresponding element 306 appear in the UI 304 displayed by the electronic device 105. In this example, two of the versions 406 of the elements 306 are larger in size than the corresponding elements 306 of UI 304, and one of the versions 406 of the elements 306 is the same size (but a different color) as the corresponding UI element 306 of UI 304. These differences in parts (but not all) of the UI 304 and the version 404 can be due to the application of one or more preferences of the other electronic device 205 (e.g., user preferences) being applied to one or more layer trees included in the visual display information received from electronic device 105. Other differences between the elements 306 and windows 308 and the corresponding versions 406 and 408 can include differences in color, font, font size, theme, orientation with respect to the user, or the like.

In one or more implementations, the other electronic device 205, on which the application 202 is not installed, receives, from electronic device 105 running application 202, information associated with user interface 304 of the application 202, such as while the user interface 304 is displayed by the electronic device 105 at a first anchor location (e.g., location 305) in a first environment (e.g., physical environment 300) of the electronic device 105. As illustrated in FIG. 5, the electronic device 205 (e.g., a second electronic device), may render a version 404 of the user interface 304 using the visual display information from electronic device 105, and may display the version 404 of the user interface 304 anchored to a second anchor location (e.g., at location 405) that is defined, using the anchoring information, relative to a second origin 410 in a second environment (e.g., physical environment 400) of the second device.

As illustrated in FIG. 5, the version 404 of UI 304 that is displayed by the other electronic device 205 may appear at a different position within the viewable area 407 corresponding to the display of the other electronic device 205 (e.g., due to the current position, orientation, etc. of the other electronic device 205 and/or the user of the other electronic device 205) than the position of UI 304 in the viewable area 307 of electronic device 105. However, the version 404 of UI 304 may be displayed, using the received anchoring information, at the same relative location with respect to the origin 410 as the relative location 305 of the UI 304 with respect to the origin 310 (see FIG. 4). In the example of FIG. 5, the physical environment 400 does not include a physical wall 301 and includes a different physical table 415 at a different physical location.

As shown in the example of FIG. 5, because the physical wall 301 of physical environment 300 does not exist in the physical environment 400, the version 404 of UI 304 displayed by the other electronic device 205 may be displayed to appear as a floating UI.

In the example of FIGS. 4 and 5, a first environment (e.g., physical environment 300) of a first device (e.g., electronic device 105) is remote from a second environment (e.g., physical environment 300) of a second device (e.g., the other electronic device 205), a first origin (e.g., origin 310) is local to the first environment and a second origin (e.g., origin 410) is local to the second environment. In this example, anchoring information that is provided from the first device to the second device may include, for example, a transform that causes a second anchor location of the version 404 to be similarly positioned relative to the second origin as the first anchor location for UI 304 is positioned relative to the first origin. However, it should also be appreciated that, in some scenarios, the first environment of the first device is the same as the second environment of the second device (e.g., the same physical environment), and the first origin and the second origin are a common origin at a single location.

As discussed herein, the version 404 of UI 304 that is displayed by the other electronic device 205 on which the application 202 is not installed may be a non-interactive version of the UI. However, in one or more other implementations, the user of the other electronic device 205 may be provided with interactivity with the version 404, such as the ability to move the version 404 to a new location, or to resize or rotate the version 404. This interactivity at the other electronic device 205 may be independent of the display of the UI 304 at electronic device 105, and/or information associated with the interactions can be transmitted to the electronic device 105 to cause corresponding movements, resizes, rotations, etc. of the UI 304 displayed by the electronic device 105.

For example, in one or more implementations, the other electronic device 205 may receive a user input to the version 404 of the user interface that is displayed at the other electronic device 205. Responsive to the user input, the other electronic device 205 may de-anchor the version 404 of the user interface displayed at the other electronic device 205 from the corresponding anchor location (e.g., at location 405), and move (and/or resize and/or rotate) the version of the user interface displayed at the second device to a new anchor location in the physical environment 400. In one or more implementations, moving the version 404 of the user interface displayed at the other electronic device 205 is independent of the display of the user interface 304 at the electronic device 105. In one or more other implementations, moving the version 404 of the user interface displayed at the other electronic device 205 causes a corresponding movement of the user interface 304 displayed at the electronic device 105 (e.g., using information describing the movement and/or the user input provided from the other electronic device 205 to the electronic device 105).

As shown in the example of FIG. 5, when the other device 205 has the same application installed as the application running on the electronic device 105, and the application is a shared application, both electronic device 105 and the other electronic device 205 can display the same UI 315 of the shared application. This is because, in contrast with the application 202 which is only installed on one of the devices, the same application running on both devices can interpret the same application data in the same way to generate local UIs for the shared application at both devices.

Figure 6:
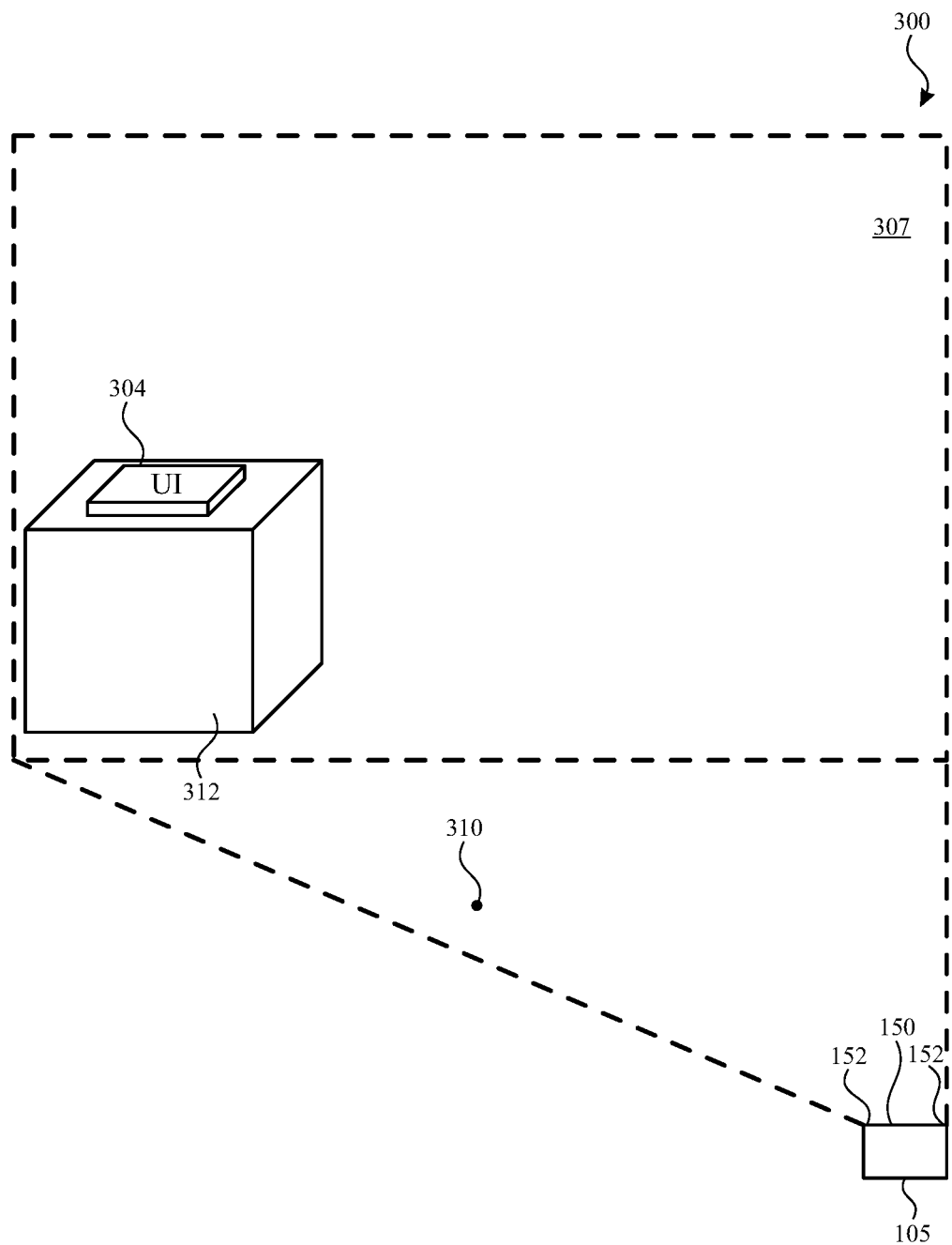
FIG. 6 illustrates an example of a physical anchor object for a user interface of a local application in a physical environment of a first electronic device in accordance with aspects of the subject technology.
Figure 7:
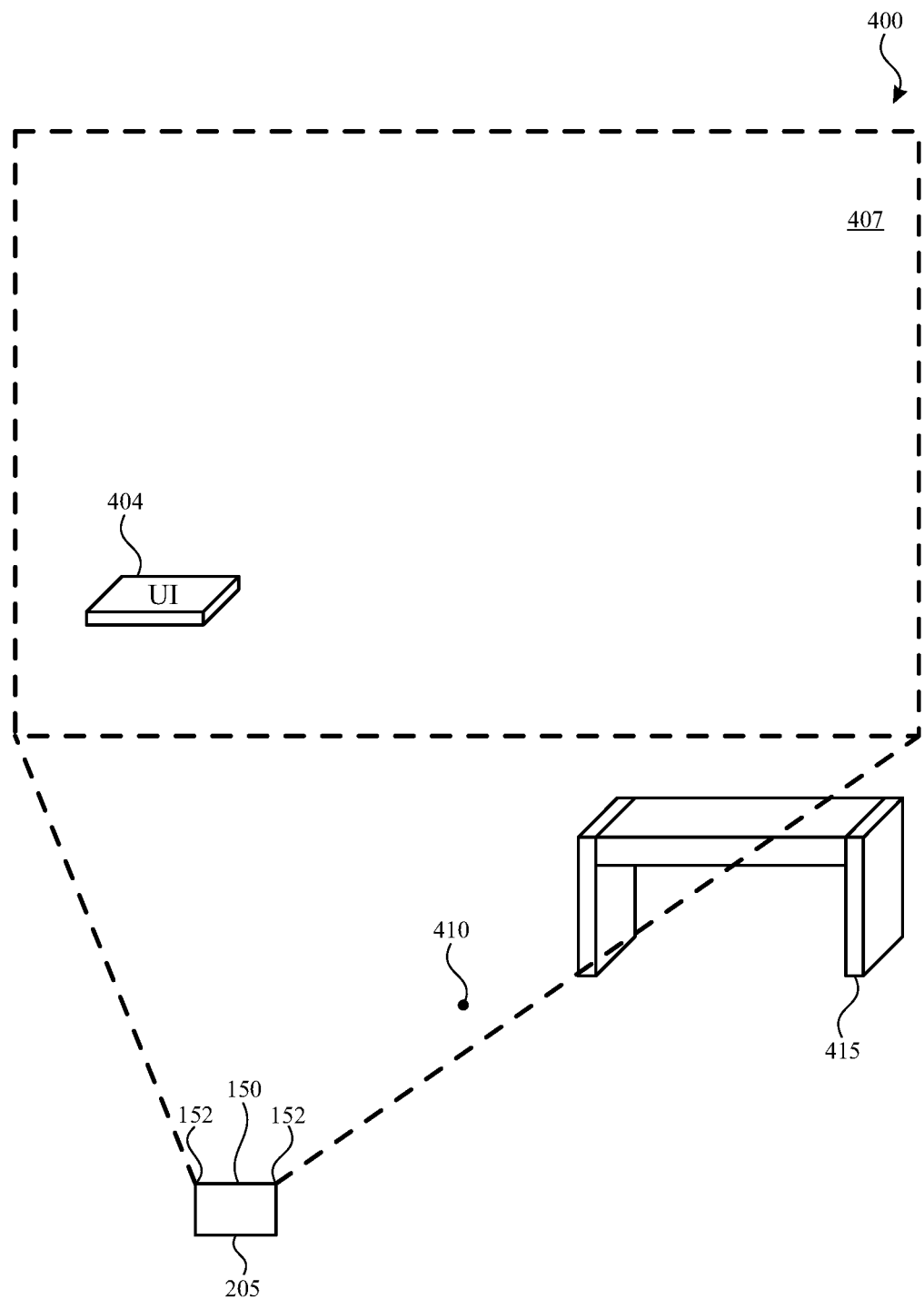
FIG. 7 illustrates an example of a version of a user interface received from a remote device and anchored to a virtual anchor in an environment of a second electronic device in accordance with aspects of the subject technology.

Although the example of FIG. 4 shows UI 304 anchored to a physical wall 301, this is merely illustrative, and the UI 304 may be initially displayed at, and/or moved by a user of electronic device 105 to, other locations. For example, FIG. 6 illustrates an example in which the UI 304 displayed on (e.g., anchored to) the physical table 312 in the physical environment 300 of electronic device 105. As illustrated in FIG. 7, because the physical table 312 does not exist in the physical environment 400 of the other electronic device 205, the version 404 of the UI 304 that is displayed by the other electronic device 205 may be displayed to appear as a floating UI at the same relative location with respect to the origin 410 as the UI 304 is displayed with respect to the origin 310.

Figure 8:
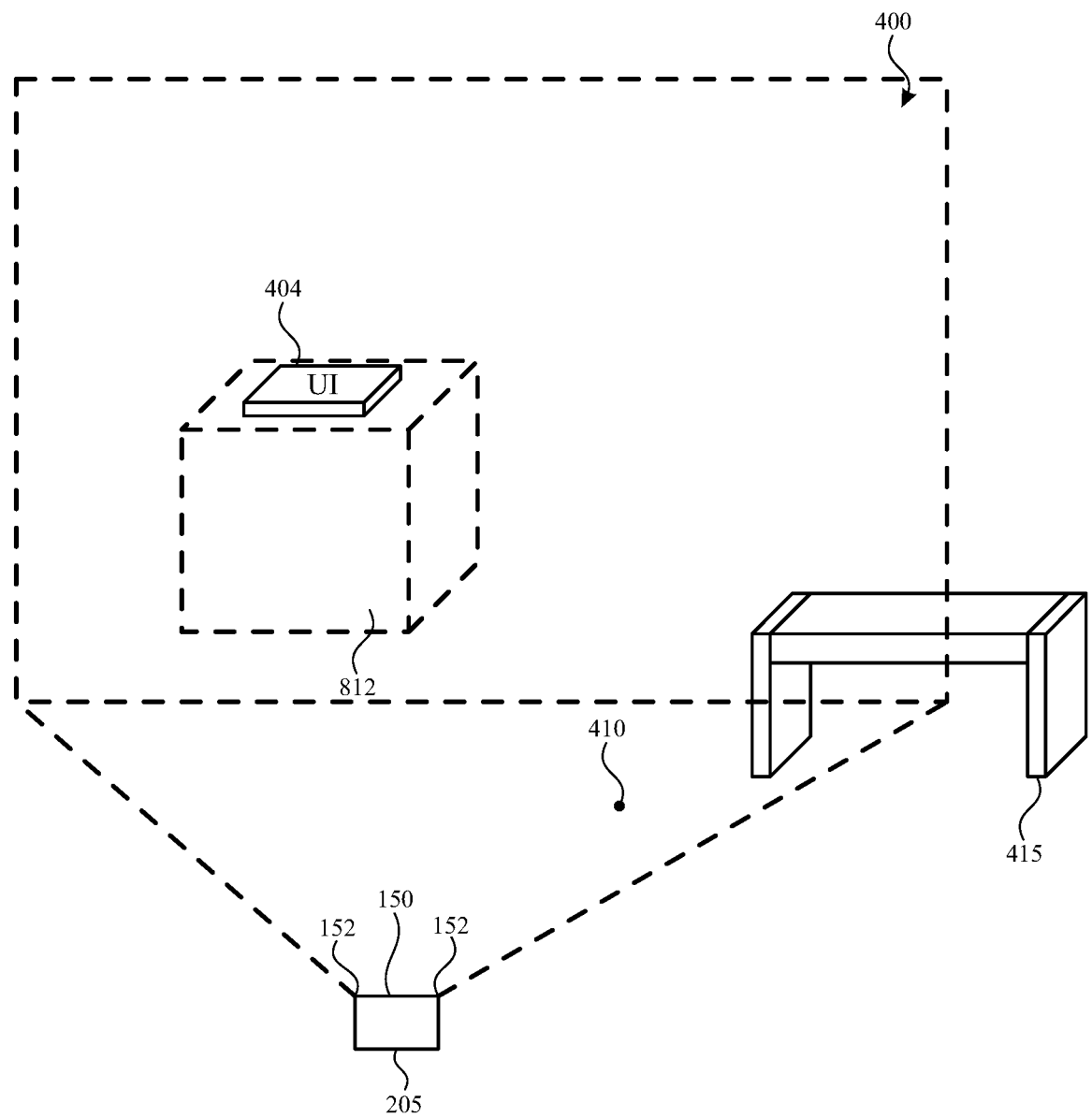
FIG. 8 illustrates an example of a version of a user interface received from a remote device and anchored to a virtual anchor object in a physical environment of a second electronic device in accordance with aspects of the subject technology

In the example of FIGS. 6 and 7, a first anchor location of the UI 304 corresponds to a physical anchor object (e.g., physical table 312) in a physical environment (e.g., physical environment 300) of the electronic device 105, and a second anchor location for the version 404 corresponds to a virtual anchor in a second environment (e.g., physical environment 400) of the other electronic device 205. As illustrated in FIG. 8, in some scenarios, when the physical anchor object (e.g., physical table 312 in this example) is not available in the physical environment 400 of the other electronic device, a virtual anchor object such as virtual table 812 may be generated for anchoring of the version 404 displayed by the other electronic device 205. In the example of FIG. 8, a virtual anchor object has been rendered for display at the virtual anchor for version 404. In this example, the virtual anchor object has a form (e.g., the form of a virtual table 812) that corresponds to a form of the physical anchor object.

As discussed above in connection with FIGS. 4 and 5, in one or more implementations, the user of the other electronic device 205 may be provided with interactivity with the version 404, such as the ability to move the version 404 to a new location, or to resize or rotate the version 404. This interactivity at the other electronic device 205 may be independent of the display of the UI 304 at electronic device 105, and/or information associated with the interactions can be transmitted to the electronic device 105 to cause corresponding movements, resizes, rotations, etc. of the UI 304 displayed by the electronic device 105.

For example, in one illustrative use case, the UI 304 of FIG. 6 may be or include a representation of a chessboard, of a chess application running at the electronic device 105, that is anchored to the physical table 312. In one or more implementations, the anchoring information provided by the electronic device 105 to the electronic device 205 may be used by the electronic device 205 to orient the chessboard in the same orientation as the chessboard that is displayed by the electronic device 105. In this example, a user of the electronic device 205 may walk or otherwise move around the displayed version 404 of the chessboard to position their self opposite the user of the electronic device 105, even when the user of the electronic device 105 and the user of the electronic device 205 are in remote locations.

In one or more other implementations, the orientation of the version 404 of the chessboard that is displayed by the electronic device 205 may be oriented differently from the orientation of the chessboard that is displayed by the electronic device 105. For example, the version 404 of the chessboard that is displayed by the electronic device 205 may be positioned similarly relative to the origin 410 as the positioning of the UI 304 relative to the origin 310 (e.g., using the anchoring information received from the electronic device 105), but rotated (e.g., based on a preference at the electronic device 205) such that the opposite side of the chessboard faces the user of the electronic device 205 than the side of the chessboard that faces the user of the electronic device 105.

In the example use case of a chessboard UI, the other electronic device 205 may receive a user input to a version 404 of the chessboard that is displayed at the other electronic device 205. For example, the user input may be a gesture input corresponding to lifting the version 404 of the chessboard that is displayed by the electronic device 205 from the virtual anchor location and placing the version 404 of the chessboard that is displayed by the electronic device 205 on the physical table 415. Responsive to this user input, the other electronic device 205 may de-anchor the version 404 of the chessboard displayed at the other electronic device 205 from the corresponding anchor location (e.g., at location 405), and move the version of the chessboard displayed at the electronic device 205 to a new anchor location associated with the physical table 415. As another example, the user input may be a gesture input corresponding to rotating the version 404 of the chessboard that is displayed by the electronic device 205 (e.g., so that a desired side of the chessboard faces the user of the electronic device 205). Responsive to this user input, the other electronic device 205 may rotate the version 404 of the chessboard displayed at the other electronic device 205 according to the rotation gesture. In one or more implementations, moving and/or rotating the version 404 of the chessboard displayed at the other electronic device 205 is independent of the display of the chessboard displayed at the electronic device 105. In one or more other implementations, moving and/or rotating the version 404 of the chessboard displayed at the other electronic device 205 causes a corresponding movement and/or rotation of the chessboard displayed at the electronic device 105 (e.g., using information describing the movement and/or the user input provided from the other electronic device 205 to the electronic device 105).

In one or more implementations, some of the user input at the electronic device 205 may cause a change in the version 404 of the chessboard that is displayed by the electronic device 205 without affecting the display of the chessboard displayed by the electronic device 105, and other user inputs to the version 404 of the chessboard that is displayed by the electronic device 205 may cause a change to the display of the chessboard at the electronic device 105. For example, the user of the electronic device 205 may be provided with the ability to rotate the chessboard without affecting the rotation of the chessboard displayed by the electronic device 105, and to move a chess piece on the version 404 of the chessboard that is displayed by the electronic device 205 causing a corresponding motion of the same chess piece on the chessboard displayed by the electronic device 105.

For example, the electronic device 105 may determine (e.g., based on the metadata provided with the version of the UI 304 transmitted from the electronic device 105) that a gesture input for rotating the chessboard in not to be transmitted back to the electronic device 105, and that gesture inputs corresponding to moving chess pieces on the chessboard are to be transmitted back to the electronic device 105. In various implementations, the gesture input information corresponding to the chess piece movement may be applied locally to the version 404 of the chessboard that is displayed by the electronic device 205 by the electronic device 205, and transmitted to the electronic device 105 for application to the chessboard displayed by the electronic device 105 (e.g., and to the underlying application for game management), or the gesture input information may be transmitted to the electronic device 105 for affecting the chessboard displayed by the electronic device 105 (e.g., and for updating the underlying application for game management), and then the version 404 of the chessboard that is displayed by the electronic device 205 may be updated based on updated UI information and/or anchoring information generated by the electronic device 105 (e.g., and transmitted from the electronic device 105 to the electronic device 205) responsive to the electronic device 105 receiving the gesture input that was provided to the electronic device 205.

Figure 9:
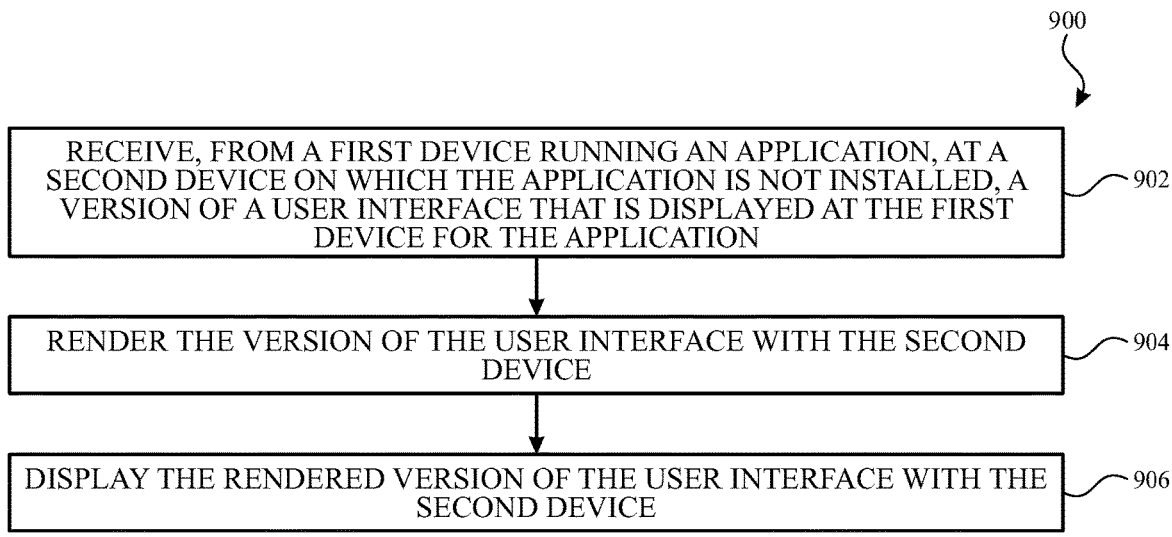
FIG. 9 illustrates a flow diagram of an example process for receiving a casted application according to aspects of the subject technology.

FIG. 9 illustrates a flow diagram of an example process for receiving a casted application according to aspects of the subject technology. The blocks of process 900 are described herein as occurring in serial, or linearly. However, multiple blocks of process 900 may occur in parallel. In addition, the blocks of process 900 need not be performed in the order shown and/or one or more blocks of process 900 need not be performed and/or can be replaced by other operations.

In the example of FIG. 9, at block 902, a version of a user interface for an application is received, from a first device running the application, at a second device on which the application is not installed. In one or more implementations, the version of the user interface includes one or more video streams associated with one or more elements of the user interface. In one or more implementations, the version of the user interface also includes one or more layer trees associated with the one or elements of the user interface, and metadata for the user interface. For example, the first device and the second device may be in communication via a secure wireless connection. In various implementations, the first device and the second device (and/or one or more additional devices) may be participant devices is a video conferencing session or a co-presence session.

In one or more implementations, the one or more elements of the user interface comprise a data editing field and a button. The one or more video streams may include a first video stream corresponding to the data editing field and a second video stream corresponding to the button.

At block 904, the version of the user interface is rendered with the second device, using the one or more layer trees and the one or more video streams. Further details of the rendering of the version of the user interface described hereinafter in connection with, for example, FIG. 10.

At block 906, the rendered version of the user interface is displayed with the second device. In one or more implementations, a user input to the version of the user interface that is displayed with the second device may be received, such as by the second device. The version of the user interface displayed at the second device may be modified according to the user input, with or without causing a modification of the user interface displayed at the first device.

For example, modifying the version of the user interface displayed at the second device may include moving, resizing, rotating, or recoloring the version of the user interface displayed at the second device independently of the user interface that is displayed at the first device (e.g., without changing the location, size, rotation, or color of the user interface that is displayed at the first device).

As another example, the second device may transmit, to the first device, information associated with the user input for causing a corresponding modification of the user interface displayed at the first device. The information associated with the user input may include a location, a motion, a direction, a depth, or other information describing the user input, relative to one or more elements of the version of the user input displayed at the second device.

Figure 10:
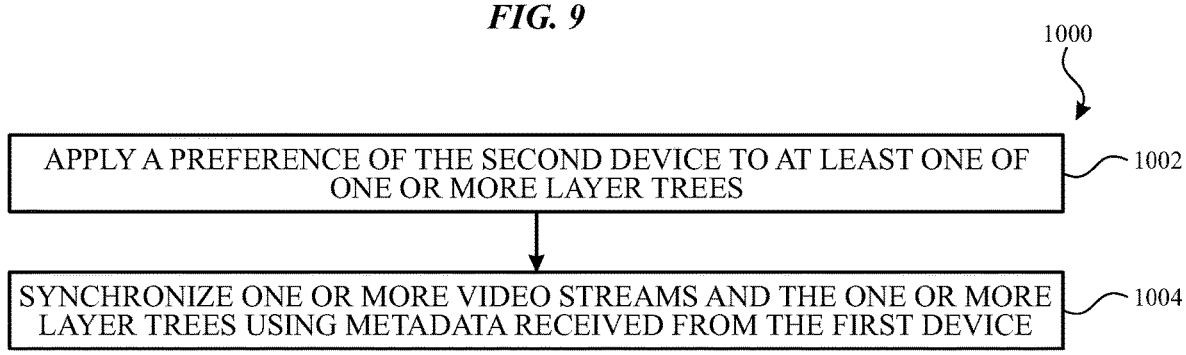
FIG. 10 illustrates a flow diagram of an example process for rendering a received version of a user interface of a casted application according to aspects of the subject technology

FIG. 10 illustrates a flow diagram of an example process for rendering a version of a user interface received from another device according to aspects of the subject technology. The blocks of process 1000 are described herein as occurring in serial, or linearly. However, multiple blocks of process 1000 may occur in parallel. In addition, the blocks of process 1000 need not be performed in the order shown and/or one or more blocks of process 1000 need not be performed and/or can be replaced by other operations.

In the example of FIG. 10, at block 1002, a preference of the second device is applied to at least one of the one or more layer trees. For example, the preference stored at the second device may include a text size, a font, a color, or a theme that is stored at the second device for display of user interfaces of other applications that are installed on the device. Because the version of the user interface provided by the first device includes the one or more layer trees in addition to the one or more video streams, the second device preferences can be applied to render the version of the user interface differently at the second device than the UI displayed at the first device.

At block 1004, the one or more video streams and the one or more layer trees are synchronized using the metadata received from the first device. Synchronizing the one or more video streams and the one or more layer trees using the metadata received from the first device may include synchronizing the one or more video streams and the one or more layer trees in time, using the metadata received from the first device. For example, the metadata may include time information that indicates which frames of each of the one or more video streams is to be included at any given time in the version of the user interface described by the one or more layer trees (which themselves may be changing over time in accordance with changes in the user interface displayed at the first device).

In one or more implementations, at least one of the one or more elements in the user interface displayed at the first device appears differently from the at least one of the one or more elements in the version of the user interface displayed at the second device, due to the application of the preference to the at least one of the one or more layer trees. For example, applying the preference of the second device to at least one of the one or more layer trees comprises modifying a size, a shape, or a color indicated by a portion of one of the one or more layer trees according to the preference, the portion corresponding to one or more of the elements of the user interface. For example, in one exemplary operational scenario, a button or other interaction tool displayed at the second device using a video stream of the button from the first device may be enlarged at the second device (e.g., relative to other elements of the user interface) based on a text size preference of the second device. As another example operational scenario, the button may have a substantially orange color as displayed by the first device and may be modified to have a substantially blue color as displayed by the second device according to a theme or a color preference of the second device.

Figure 11:
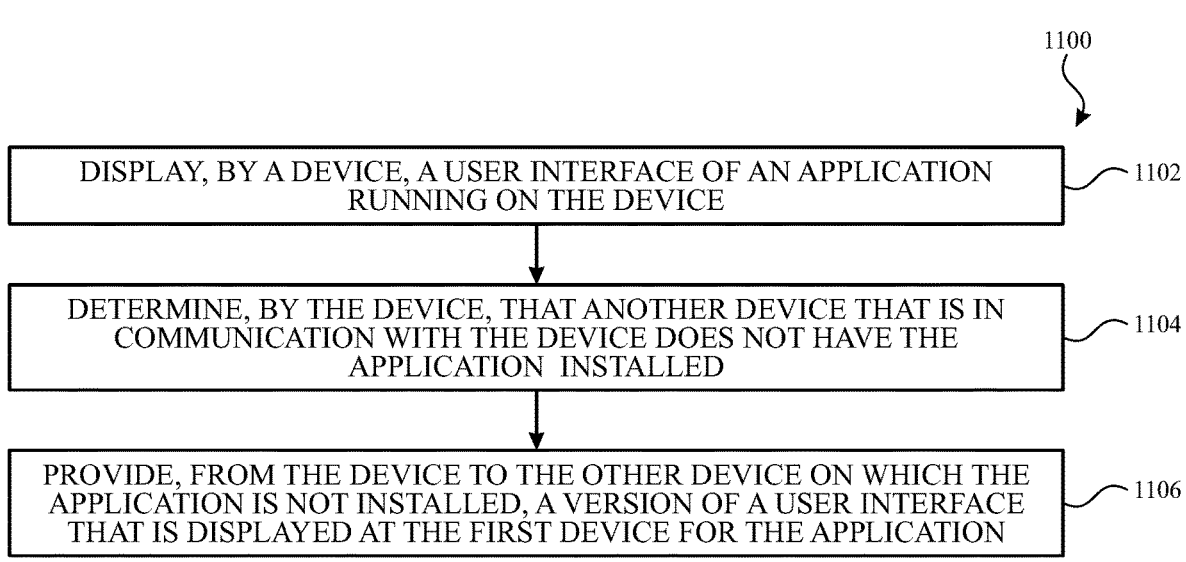
FIG. 11 illustrates a flow diagram of an example process for application casting according to aspects of the subject technology.

FIG. 11 illustrates a flow diagram of an example process for casting an application according to aspects of the subject technology. The blocks of process 1100 are described herein as occurring in serial, or linearly. However, multiple blocks of process 1100 may occur in parallel. In addition, the blocks of process 1100 need not be performed in the order shown and/or one or more blocks of process 1100 need not be performed and/or can be replaced by other operations.

In the example of FIG. 11, at block 1102, a device displays a user interface of an application running on the device. The user interface may include one or more elements such as elements 306 of the user interface 304 of FIG. 4.

At block 1104, the device may determine that another device that is in communication with the device does not have the application installed. Determining that the other device does not have the application installed may include sending a query from the first device to the other device or to a server associated with the device and the other device, and receiving, responsive to the query from the other device or the server, an indication that the application is not available or not installed at the other device. Determining that the other device does not have the application installed may be performed when the application is launched at the device, responsive to a request for application sharing from a user of the application running on the device, or prior to launch of the application (e.g., during a handshake operation and/or during establishment of a communication session between the device and the other device). Determining that the other device does not have the application installed may be performed by the application and/or by one or more background or system processes running on the device and in communication with the application.

At block 1106, the device provides, to the other device on which the application is not installed, a version of a user interface that is displayed at the device for the application. The version of the user interface that is provided from the device to the other device may include one or more video streams associated with one or more elements of the user interface, one or more layer trees associated with the one or elements of the user interface, and metadata for the user interface. For example, the one or more video streams include a plurality of video streams each corresponding to one of a plurality of elements of the user interface. The metadata may include time information for synchronization of the one or more video streams and the one or more layer trees.

In one or more implementations, the device receives a user input to the user interface displayed at the device. As examples, the user input may include text input to a text entry field of the UI, a click of a displayed button of the UI, or a resizing of an element (e.g., a sub-window) of the UI). The device may modify the user interface displayed at the device according to the user input (e.g., to display the typed text in the text entry field, to perform the action corresponding to the button, or to resize the element of the user interface). The device may modify at least one of the one or more video streams and the one or more layer trees according to the user input so that the other device can render corresponding modifications to the version of the user interface displayed at the other device. For example, modifying at least one of the one or more video streams and the one or more layer trees according to the user input may include modifying one of the plurality of video streams (e.g., a video stream corresponding to the text entry field or a video stream corresponding to the button), independently of another one of the plurality of video streams.

As described herein, the version of the user interface displayed at the other device may be a non-interactive version of the user interface. However, in some implementations, some interactivity with the version of the user interface may be provided by the other device. For example, in one or more implementations, the device may receive, from the other device, an indication of a user input to the version of the user interface displayed at the other device, and modify the user interface displayed at the device according to the user input to the version of the user interface displayed at the other device.

In one or more implementations, the process 1100 may also include determining, by the device, a reduced capability (e.g., a reduced bandwidth and/or a reduced computing capability) of other device, ceasing providing the version of the user interface that includes the one or more video streams, the one or more layer trees, and the metadata to the other device, and providing, from the device to the other device, a single video stream that represents the entire user interface that is displayed at the device for the application.

In one or more implementations, the user interface displayed by the device may be displayed in a three-dimensional display such as a mixed reality or virtual reality environment. To allow the other device to display the version of the UI similarly to the UI displayed by the device, anchoring information may also be provided from the device to the other device. For example, displaying the user interface of the application running on the device may include displaying the user interface anchored to a physical anchor in a physical environment of the device, and anchor information for the version of the user interface can be provided to the other device. The anchor information can include, for example, a transform between an origin in the physical environment of the first device and the UI displayed by the first device.

Providing anchoring information to the other device can be helpful, for example, if the user of the device is verbally describing the location of the user interface in their environment or the location of content of an element of the user interface relative to other elements of the user interface, and the user of the other device (e.g., at a remote location) desires to view the UI or element thereof that is being described.

Further features of implementations in which application casting is provided for three-dimensional display are described in connection with FIGS. 12 and 13.

Figure 12:
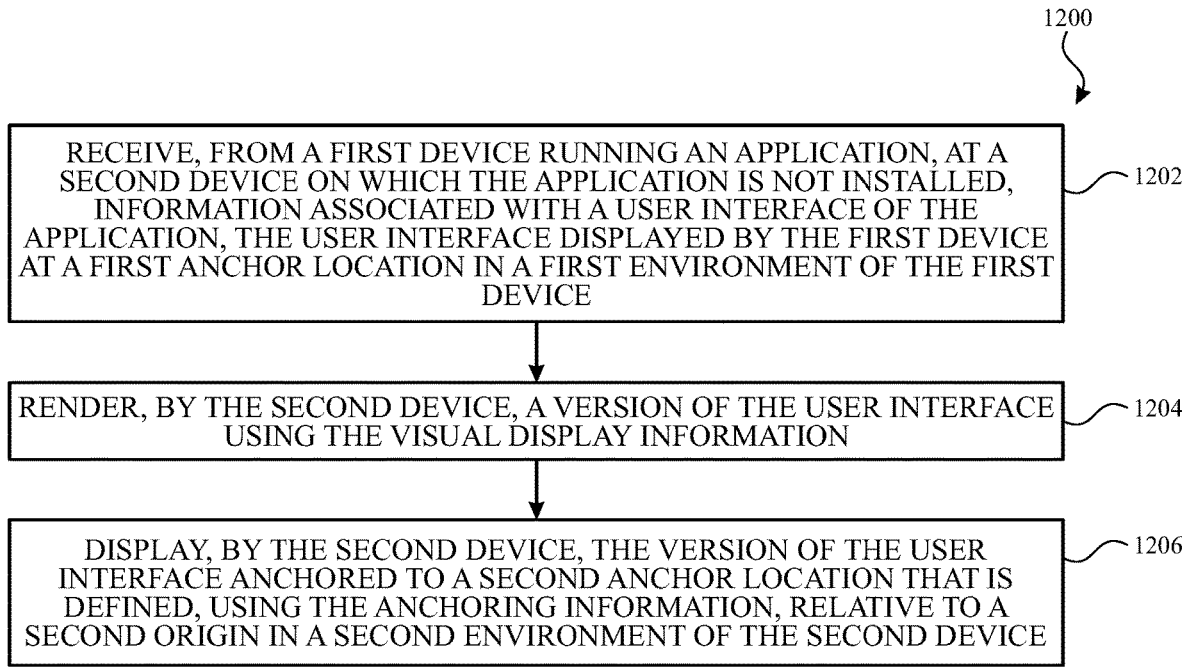
FIG. 12 illustrates a flow diagram of an example process for receiving a casted application for three-dimensional display with anchoring according to aspects of the subject technology.

FIG. 12 illustrates a flow diagram of an example process for receiving a casted application for three-dimensional display according to aspects of the subject technology. The blocks of process 1200 are described herein as occurring in serial, or linearly. However, multiple blocks of process 1200 may occur in parallel. In addition, the blocks of process 1200 need not be performed in the order shown and/or one or more blocks of process 1200 need not be performed and/or can be replaced by other operations.

In the example of FIG. 12, at block 1202, a second device on which an application is not installed receives, from a first device running the application, information associated with a user interface of the application displayed by the first device at a first anchor location in a first environment of the first device. For example, the information associated with the user interface may include visual display information and anchoring information for the user interface. The anchoring information may define the first anchor location relative to a first origin in the first environment of the first device.

At block 1204, the second device renders a version of the user interface using the visual display information (e.g., remote UI information). Rendering the version of the user interface may include synchronizing one or more video streams in the visual display information with one or more layer trees in the visual display information using metadata included in the visual display information (e.g., by performing one or more of the operations described above in connection with FIG. 10).

At block 1206, the second device displays the version of the user interface anchored to a second anchor location that is defined, using the anchoring information, relative to a second origin in a second environment of the second device. For example, the anchoring information may include a transform between the first origin and the first anchor location for the user interface. Displaying the version of the user interface anchored to the second anchor location may include determining the second anchor location by applying the same transform relative to the second origin.

In one or more implementations, the first anchor location corresponds to a physical anchor object in a physical environment of the first device, and the second anchor location corresponds to a virtual anchor in the second environment of the second device (e.g., as described above in connection with FIG. 7). In one or more implementations, the second device may render and/or display a virtual anchor object at the virtual anchor location (e.g., as described above in connection with FIG. 8). For example, the virtual anchor object may have a form that corresponds to a form of the physical anchor object.

In one or more implementations, the first environment of the first device is the same as the second environment of the second device (e.g., the same physical environment), and the first origin and the second origin are a common origin at a single location. In other implementations, the first environment of the first device is remote from the second environment of the second device, the first origin is local to the first environment and the second origin is local to the second environment, and the anchoring information includes a transform that causes the second anchor location to be similarly positioned relative to the second origin as the first anchor location is positioned relative to the first origin.

As described herein, the version of the user interface displayed at the other device may be a non-interactive version of the user interface. However, in some implementations, some interactivity with the version of the user interface may be provided by the other device. For example, in one or more implementations, the second device may receive a user input to the version of the user interface displayed at the second device (e.g., a user input such as a gesture corresponding to grabbing and moving the user interface). Responsive to the user input, the second device may de-anchor the version of the user interface displayed at the second device from the second anchor location, and move the version of the user interface displayed at the second device to a new anchor location in the second environment. In one or more implementations, moving the version of the user interface displayed at the second device is independent of display of the user interface at the first device. In one or more other implementations, moving the version of the user interface displayed at the second device causes a corresponding movement of the user interface displayed at the first device. For example, an indication of the user input may be transmitted from the second device to the first device so that the first device can perform a corresponding movement of the user interface as displayed at the first device.

Figure 13:
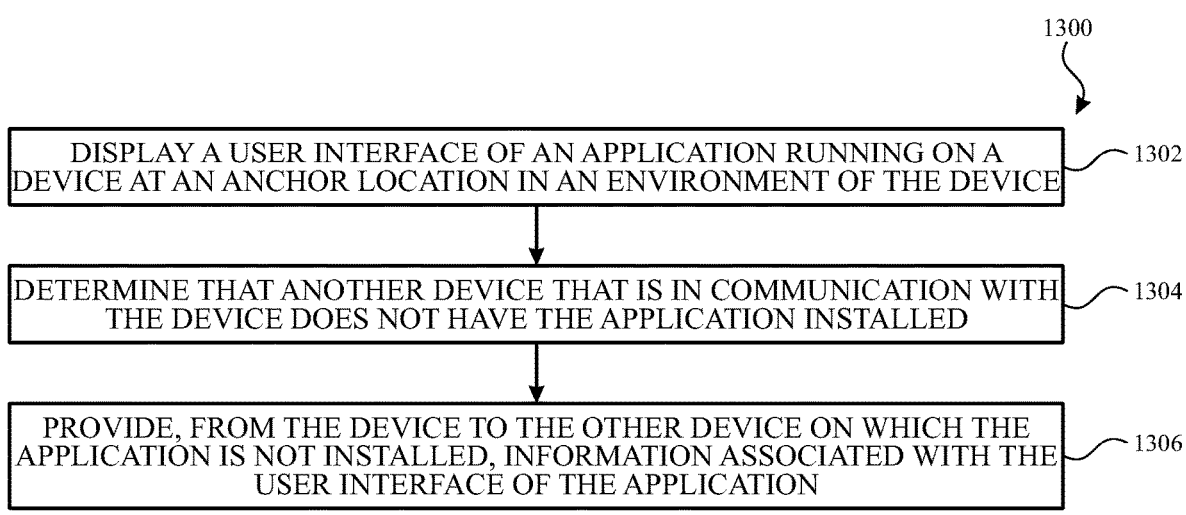
FIG. 13 illustrates a flow diagram of an example process for application casting with anchoring according to aspects of the subject technology.

FIG. 13 illustrates a flow diagram of an example process for casting an application for three-dimensional display according to aspects of the subject technology. The blocks of process 1300 are described herein as occurring in serial, or linearly. However, multiple blocks of process 1300 may occur in parallel. In addition, the blocks of process 1300 need not be performed in the order shown and/or one or more blocks of process 1300 need not be performed and/or can be replaced by other operations.

In the example of FIG. 13, at block 1302, a user interface of an application running on a device is displayed at an anchor location in an environment of the device.

At block 1304, the device may determine that another device that is in communication with the device does not have the application installed. Determining that the other device does not have the application installed may include sending a query from the first device to the other device or to a server associated with the device and the other device, and receiving, responsive to the query from the other device or the server, an indication that the application is not available or not installed at the other device. Determining that the other device does not have the application installed may be performed when the application is launched at the device, responsive to a request for application sharing from a user of the application running on the device, or prior to launch of the application (e.g., during a handshake operation and/or during establishment of a communication session between the device and the other device). Determining that the other device does not have the application installed may be performed by the application and/or by one or more background processes running on the device and in communication with the application.

At block 1306, the device may provide, to the other device on which the application is not installed, information associated with the user interface of the application. The information associated with the user interface may include visual display information and anchoring information for the user interface. The anchoring information may define the anchor location relative to an origin in the environment of the device. For example, the anchoring information may include a transform between the origin and the anchor location for the user interface. The visual display information (e.g., remote UI information) may include multiple video streams, each corresponding to an element of the user interface. The visual display information may also include metadata that includes time information for rendering of a version of the user interface at the other device using the plurality of video streams.

In one or more implementations, the anchor location in the environment of the device corresponds to a physical anchor object in a physical environment of the device, and the physical anchor object is unavailable in another physical environment of the other device (e.g., as described above in connection with FIG. 7). In one or more implementations, the device may identify the physical anchor object responsive to a request from the application for the physical anchor object (e.g., a request for a particular physical object such as a table or a wall, or for a more general physical object such as a vertical plane or a horizontal plane).

As described above, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in a collaborative setting with multiple users. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of sharing information from a particular application, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 14:
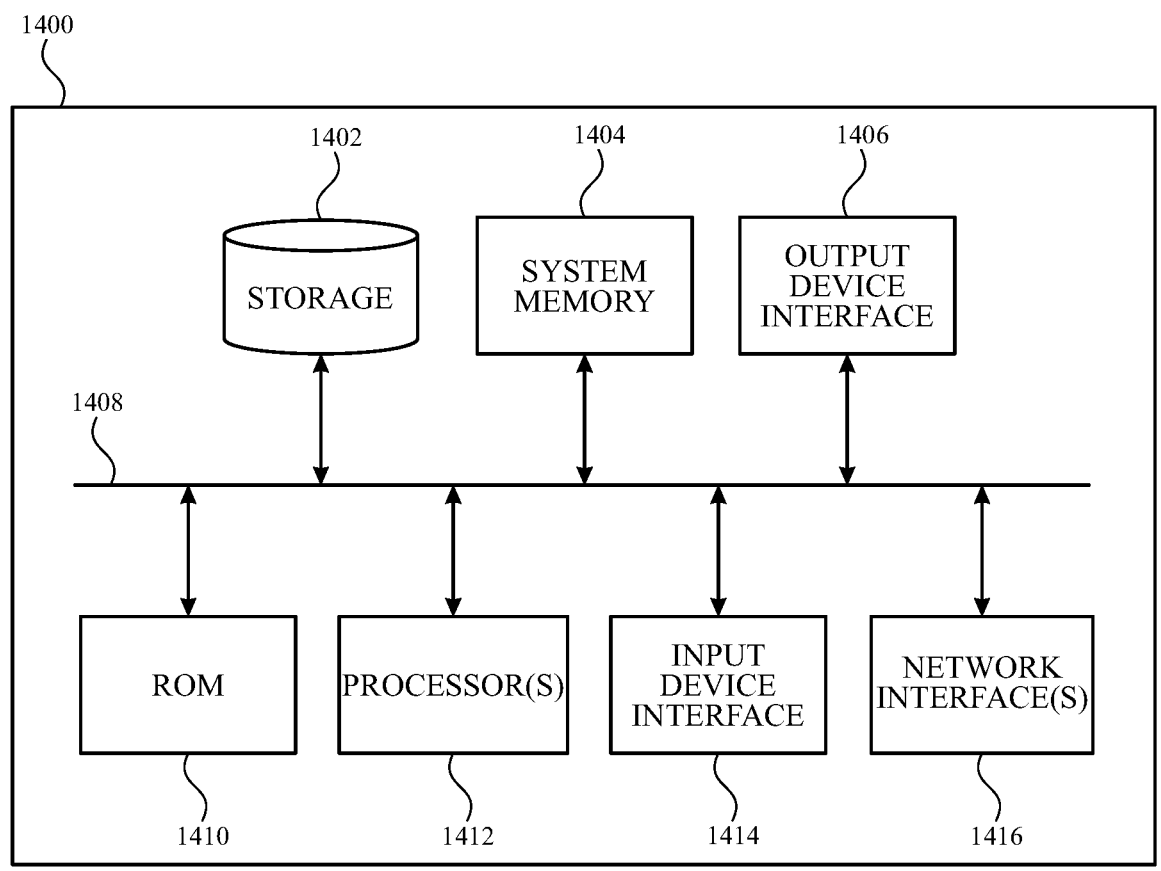
FIG. 14 illustrates an example computing device with which aspects of the subject technology may be implemented.

FIG. 14 illustrates an example computing device with which aspects of the subject technology may be implemented in accordance with one or more implementations. The computing device 1400 can be, and/or can be a part of, any computing device or server for generating the features and processes described above, including but not limited to a laptop computer, a smartphone, a tablet device, a wearable device such as a goggles or glasses, and the like. The computing device 1400 may include various types of computer readable media and interfaces for various other types of computer readable media. The computing device 1400 includes a permanent storage device 1402, a system memory 1404 (and/or buffer), an input device interface 1406, an output device interface 1408, a bus 1410, a ROM 1412, one or more processing unit(s) 1414, one or more network interface(s) 1416, and/or subsets and variations thereof.

The bus 1410 collectively represents all system, peripheral, and chipset buses that communicatively connect the numerous internal devices of the computing device 1400. In one or more implementations, the bus 1410 communicatively connects the one or more processing unit(s) 1414 with the ROM 1412, the system memory 1404, and the permanent storage device 1402. From these various memory units, the one or more processing unit(s) 1414 retrieves instructions to execute and data to process in order to execute the processes of the subject disclosure. The one or more processing unit(s) 1414 can be a single processor or a multi-core processor in different implementations.

The ROM 1412 stores static data and instructions that are needed by the one or more processing unit(s) 1414 and other modules of the computing device 1400. The permanent storage device 1402, on the other hand, may be a read-and-write memory device. The permanent storage device 1402 may be a non-volatile memory unit that stores instructions and data even when the computing device 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1414 may need at runtime. In one or more implementations, the processes of the subject disclosure are stored in the system memory 1404, the permanent storage device 1402, and/or the ROM 1412.

From these various memory units, the one or more processing unit(s) 1414 retrieves instructions to execute and data to process in order to execute the processes of one or more implementations.

The bus 1410 also connects to the input and output device interfaces 1406 and 1408. The input device interface 1406 enables a user to communicate information and select commands to the computing device 1400. Input devices that may be used with the input device interface 1406 may include, for example, alphanumeric keyboards and pointing devices (also called "cursor control devices"). The output device interface 1408 may enable, for example, the display of images generated by computing device 1400. Output devices that may be used with the output device interface 1408 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1410 also couples the computing device 1400 to one or more networks and/or to one or more network nodes through the one or more network interface(s) 1416. In this manner, the computing device 1400 can be a part of a network of computers (such as a LAN, a wide area network ("WAN"), or an Intranet, or a network of networks, such as the Internet. Any or all components of the computing device 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, from a first device running an application, at a second device on which the application is not installed, a version of a user interface that is displayed at the first device for the application, wherein the version of the user interface comprises:
   one or more video streams associated with one or more elements of the user interface, wherein the one or more video streams comprise a first video stream corresponding to a first user interface element and a second video stream corresponding to a second user interface element, one or more layer trees associated with the one or more elements of the user interface, and metadata for the user interface, rendering the version of the user interface with the second device using the one or more layer trees and the one or more video streams, by:
   applying a preference of the second device to at least one of the one or more layer trees, and synchronizing the one or more video streams and the one or more layer trees using the metadata received from the first device; and displaying the rendered version of the user interface with the second device.

2. The method of claim 1, wherein at least one of the one or more elements in the user interface displayed at the first device appears differently from the at least one of the one or more elements in the version of the user interface displayed at the second device due to the application of the preference to the at least one of the one or more layer trees.

3. The method of claim 1, wherein the one or more elements of the user interface comprise a data editing field and a button.

4. The method of claim 1, wherein the preference stored at the second device comprises a text size, a color, or a theme.

5. The method of claim 1, further comprising receiving a user input to the version of the user interface that is displayed with the second device.

6. The method of claim 5, further comprising modifying the version of the user interface displayed at the second device according to the user input without causing a modification of the user interface displayed at the first device.

7. The method of claim 6, wherein modifying the version of the user interface displayed at the second device comprises moving, resizing, rotating, or recoloring the version of the user interface displayed at the second device, independently of the user interface that is displayed at the first device.

8. The method of claim 5, further comprising:
   modifying the version of the user interface displayed at the second device according to the user input; and
   transmitting, to the first device, information associated with the user input for causing a corresponding modification of the user interface displayed at the first device.

9. The method of claim 1, wherein synchronizing the one or more video streams and the one or more layer trees using the metadata received from the first device comprises synchronizing the one or more video streams and the one or more layer trees in time, using the metadata received from the first device.

10. The method of claim 1, wherein applying the preference of the second device to at least one of the one or more layer trees comprises modifying a size, a shape, or a color indicated by a portion of one of the one or more layer trees according to the preference, the portion corresponding to one or more of the elements of the user interface.

11. A computer program product comprising code stored in a tangible non-transitory computer-readable storage medium, the code comprising:
code for receiving, from a first device running an application, at a second device on which the application is not installed, a version of a user interface that is displayed at the first device for the application, wherein the version of the user interface comprises:
one or more video streams associated with one or more elements of the user interface, wherein the one or more video streams comprise a first video stream corresponding to a first user interface element and a second video stream corresponding to a second user interface element, one or more layer trees associated with the one or more elements of the user interface, and metadata for the user interface, code for rendering the version of the user interface with the second device using the one or more layer trees and the one or more video streams, by:
applying a preference of the second device to at least one of the one or more layer trees, and synchronizing the one or more video streams and the one or more layer trees using the metadata received from the first device;
and code for displaying the rendered version of the user interface with the second device.

12. The computer program product of claim 11, wherein applying the preference of the second device to at least one of the one or more layer trees comprises modifying a size, a shape, or a color indicated by a portion of one of the one or more layer trees according to the preference, the portion corresponding to one or more of the elements of the user interface.

13. A device, comprising:
a processor;
and a memory containing instructions that, when executed by the processor, cause the processor to:
receive, from an other device running an application, a version of a user interface that is displayed at the other device for the application, wherein the application is not installed at the device, wherein the version of the user interface comprises:
one or more video streams associated with one or more elements of the user interface, wherein the one or more video streams comprise a first video stream corresponding to a first user interface element and a second video stream corresponding to a second user interface element, one or more layer trees associated with the one or more elements of the user interface, and metadata for the user interface, render the version of the user interface using the one or more layer trees and the one or more video streams, by:
applying a preference of the device to at least one of the one or more layer trees, and synchronizing the one or more video streams and the one or more layer trees using the metadata received from the other device;
and display the rendered version of the user interface.

14. The device of claim 13, wherein the one or more elements of the user interface comprise a data editing field and a button.

15. The device of claim 13, further comprising:
receiving a user input to the version of the user interface that is displayed with the device; and
modifying the version of the user interface displayed at the device according to the user input without causing a modification of the user interface displayed at the other device.

16. The device of claim 13, wherein applying the preference of the device to at least one of the one or more layer trees comprises modifying a size, a shape, or a color indicated by a portion of one of the one or more layer trees according to the preference, the portion corresponding to one or more of the elements of the user interface.

17. A system, comprising:
a first device displaying a user interface of an application installed and running at the first device;
and a second device, wherein the second device is configured to:
receive, from the first device, a version of the user interface that is displayed at the first device for the application, wherein the version of the user interface comprises:
one or more video streams associated with one or more elements of the user interface, wherein the one or more video streams comprise a first video stream corresponding to a first user interface element and a second video stream corresponding to a second user interface element, one or more layer trees associated with the one or more elements of the user interface, and metadata for the user interface, render the version of the user interface with the second device using the one or more layer trees and the one or more video streams, by:
applying a preference of the second device to at least one of the one or more layer trees, and synchronizing the one or more video streams and the one or more layer trees using the metadata received from the first device;
and display the rendered version of the user interface with the second device.

18. The system of claim 17, wherein at least one of the one or more elements in the user interface displayed at the first device appears differently from the at least one of the one or more elements in the version of the user interface displayed at the second device due to the application of the preference to the at least one of the one or more layer trees.

19. The system of claim 17, further comprising:
receiving a user input to the version of the user interface that is displayed with the second device;
modifying the version of the user interface displayed at the second device according to the user input; and
transmitting, to the first device, information associated with the user input for causing a corresponding modification of the user interface displayed at the first device.

20. The system of claim 17, wherein applying the preference of the second device to at least one of the one or more layer trees comprises modifying a size, a shape, or a color indicated by a portion of one of the one or more layer trees according to the preference, the portion corresponding to one or more of the elements of the user interface.

21. The system of claim 17, wherein the one or more elements of the user interface comprise a data editing field and a button.

* * * * *